US012649384B2

(12) United States Patent
Ando

(10) Patent No.: US 12,649,384 B2
(45) Date of Patent: Jun. 9, 2026

(54) BATTERY ELECTRIC VEHICLE

(71) Applicant: TOYOTA JIDOSHA KABUSHIKI KAISHA, Toyota (JP)

(72) Inventor: Yuya Ando, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 60 days.

(21) Appl. No.: 18/826,720

(22) Filed: Sep. 6, 2024

(65) Prior Publication Data

US 2025/0145051 A1      May 8, 2025

(30) Foreign Application Priority Data

Nov. 6, 2023      (JP) ................................. 2023-189379

(51) Int. Cl.
| | |
|---|---|
| *B60L 58/18* | (2019.01) |
| *B60L 53/80* | (2019.01) |
| *B60L 58/12* | (2019.01) |
| *B60L 58/27* | (2019.01) |

(52) U.S. Cl.
CPC .............. *B60L 58/18* (2019.02); *B60L 53/80* (2019.02); *B60L 58/27* (2019.02); *B60L 58/12* (2019.02)

(58) Field of Classification Search
CPC .......... B60L 58/18; B60L 53/80; B60L 58/27; B60L 58/12; B60L 58/20; B60L 2240/545; B60L 1/02; B60L 1/04; B60L 50/50; B60L 50/60; B60L 50/64; B60L 50/66; B60L 58/10; B60L 58/13; B60L 58/16; B60L 58/24; Y02T 10/70; H02J 7/00309;

(Continued)

(56) References Cited

U.S. PATENT DOCUMENTS

2012/0306445 A1* 12/2012 Park ........................ B60L 53/80
                                                    29/730
2015/0104687 A1      4/2015 Morimoto et al.

(Continued)

FOREIGN PATENT DOCUMENTS

CN      109411848 A      3/2019
JP      2012-151916 A      8/2012

(Continued)

*Primary Examiner* — Abby Lin
*Assistant Examiner* — Esvinder Singh
(74) *Attorney, Agent, or Firm* — SoraIP, Inc.

(57)      ABSTRACT

A battery electric vehicle includes: a traction motor; an inverter driving the motor; a first battery; an electric device running on electric power from the first battery; a detachable portable second battery; a first connecting and disconnecting device connecting and disconnecting a power line connected to the inverter and the first battery to and from each other; a second connecting and disconnecting device connecting and disconnecting the power line and the second battery to and from each other; and a control device controlling the first connecting and disconnecting device and the second connecting and disconnecting device. When a system startup instruction is given, the control device controls the first and second connecting and disconnecting devices so that the second battery is preferentially connected to the power line over the first battery when a temperature of the second battery is within an allowable temperature range of the second battery.

4 Claims, 6 Drawing Sheets

(58) Field of Classification Search
     CPC .......... H02J 7/007194; H01M 10/625; H01M
                       2220/20; B60R 16/033; B60R 16/04
     See application file for complete search history.

(56)                References Cited

U.S. PATENT DOCUMENTS

2016/0052396  A1*   2/2016  Tsuchiya ................. B60L 58/25
                                                        903/907
2020/0086761  A1*   3/2020  Hamada ................... B60L 58/19
2020/0169115  A1*   5/2020  Yasoshima ............. H02J 1/001
2023/0010424  A1    1/2023  Hasebe
2023/0211699  A1    7/2023  Lee
2024/0208364  A1*   6/2024  Mihune ................. H02J 7/0047
2025/0135953  A1*   5/2025  Lee ..................... H01M 10/486

FOREIGN PATENT DOCUMENTS

JP          2015-080284  A      4/2015
JP          2019-170096  A     10/2019
JP          2020-043718  A      3/2020
JP          2023-099463  A      7/2023
WO          2021/125282  A1     6/2021

* cited by examiner

BATTERY ELECTRIC VEHICLE

CROSS-REFERENCE TO RELATED APPLICATION

This application claims priority to Japanese Patent Application No. 2023-189379 filed on Nov. 6, 2023, incorporated herein by reference in its entirety.

BACKGROUND

1. Field of the Disclosure

The present disclosure relates to battery electric vehicles.

2. Description of Related Art

Conventionally, there has been proposed a battery electric vehicle including a traction motor (motor generator), an inverter for driving the motor, an electric device (electric heating unit) for operating with power consumption, and a battery (main battery) (see, for example, Japanese Unexamined Patent Application Publication No. 2015-80284 (JP 2015-80284 A)). In this vehicle, when the battery temperature is low at system startup, the electric device is operated to warm up the battery by the heat generated by the internal resistance of the battery.

SUMMARY

In the above battery electric vehicle, the battery temperature is often low at system startup. As the battery temperature is often low at system startup, the battery needs to be warmed up often, which results in high power consumption for warming up the battery.

A primary object of a battery electric vehicle of the present disclosure is to reduce power consumption for warming up a battery.

In order to achieve the primary object, the battery electric vehicle of the present disclosure adopts the following measures. The battery electric vehicle of the present disclosure includes: a traction motor; an inverter that drives the motor; a first battery; an electric device that runs on electric power from the first battery; a detachable portable second battery; a first connecting and disconnecting device connecting and disconnecting a power line connected to the inverter and the first battery to and from each other; a second connecting and disconnecting device connecting and disconnecting the power line and the second battery to and from each other; and a control device that controls the first connecting and disconnecting device and the second connecting and disconnecting device.

In a case where a system startup instruction is given, the control device controls the first and second connecting and disconnecting devices in such a manner that the second battery is preferentially connected to the power line over the first battery when a temperature of the second battery is within an allowable temperature range of the second battery.

In the battery electric vehicle of the present disclosure, in a case where the system startup instruction is given and the temperature of the second battery is within the allowable temperature range of the second battery, the control device may control the first and second connecting and disconnecting devices in such a manner that the power line and the first battery are disconnected and the power line and the second battery are connected when a predetermined connection condition is satisfied, and the control device may control the first and second connecting and disconnecting devices in such a manner that the power line and the first battery are connected and the power line and the second battery are disconnected and operates the electric device to warm up the first battery when the predetermined connection condition is not satisfied.

In this case, the predetermined connection condition may be that all of conditions selected from the following four conditions are satisfied: a first condition that the second battery is normal, a second condition that a state of charge of the second battery is within an allowable state of charge range of the second battery, a third condition that the temperature of the second battery is higher than a temperature of the first battery, and a fourth condition that the temperature of the first battery is within a no-warmup range in which the first battery is usable without being warmed up.

In a case where the system startup instruction is given and the temperature of the second battery is out of the allowable temperature range, or in a case where the system startup instruction is given, the temperature of the second battery is within the allowable temperature range, and the predetermined connection condition is not satisfied, the control device may control the first and second connecting and disconnecting devices in such a manner that the power line and the first battery are connected and the power line and the second battery are disconnected and operates the electric device to warm up the first battery when the first battery is normal and a state of charge of the first battery is within an allowable state of charge range of the first battery, and the control device may prohibit system startup when the first battery is not normal or the state of charge of the first battery is out of the allowable state of charge range of the first battery.

The battery electric vehicle of the present disclosure may further include a notification device that notifies information. When the second battery is installed at system shutdown, the control device may control the notification device to notify information indicating that the second battery is installed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a configuration diagram schematically showing a configuration of a battery pack 39a;

DETAILED DESCRIPTION OF EMBODIMENTS

Figure 1:
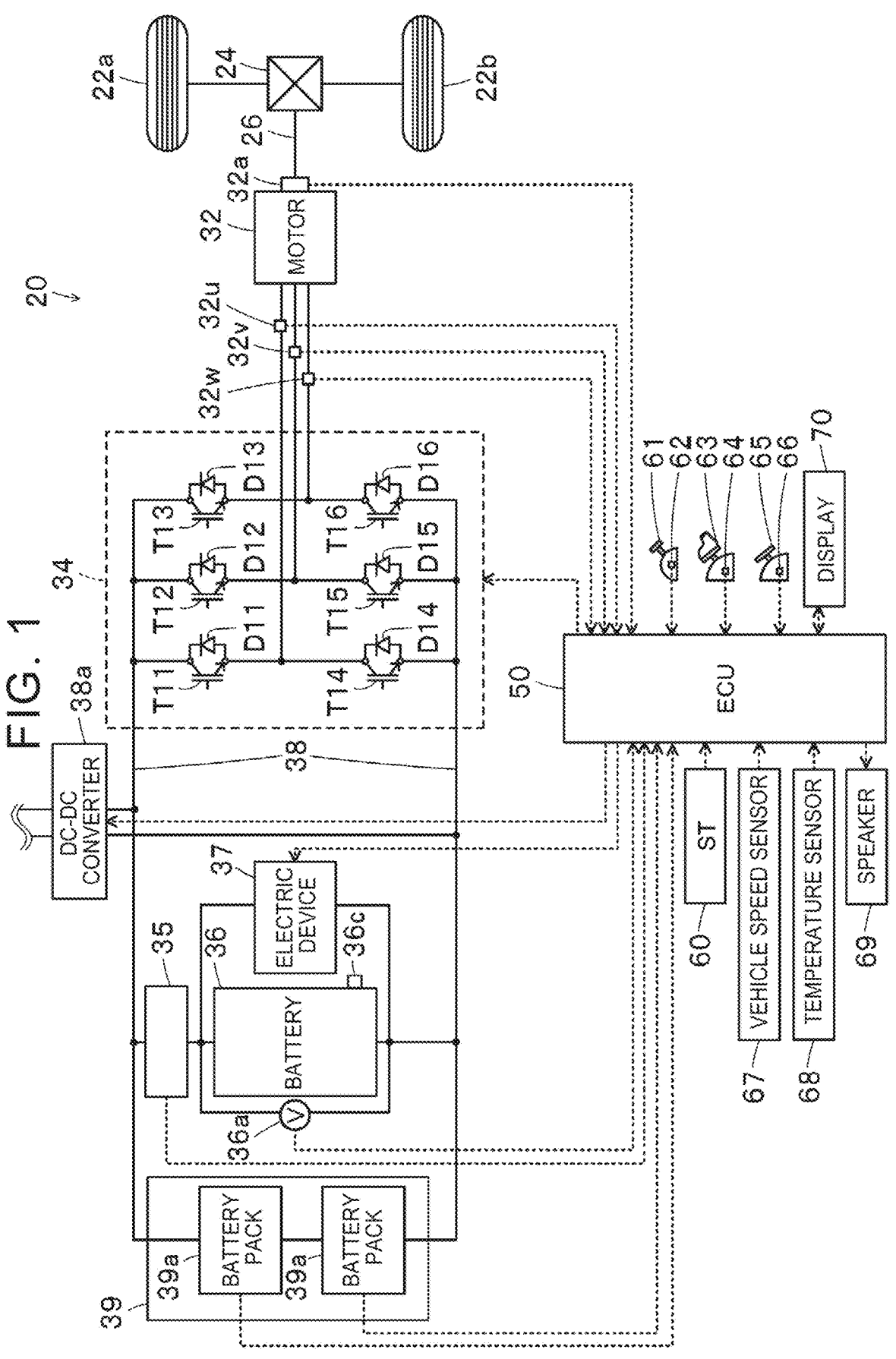
FIG. 1 is a schematic configuration diagram of a battery electric vehicle 20 according to an embodiment of the present disclosure.

Embodiments of the present disclosure will be described with reference to the drawings. FIG. 1 is a schematic configuration diagram of a battery electric vehicle 20 according to an embodiment of the present. As illustrated, battery electric vehicle 20 of the embodiment includes a motor 32, an inverter 34, a first battery 36, an electric device 37, a second battery 39, and an electronic control unit (hereinafter referred to as "ECU") 50.

The motor 32 is configured as a three-phase AC motor, and includes a rotor in which a permanent magnet is embedded in a rotor core, and a stator in which a three-phase coil is wound around the stator core. The rotor of the motor 32 is connected to a drive shaft 26 connected to the drive wheels 22a, 22b via a differential gear 24. Inverter 34 is used to drive motor 32 and is connected to power line 38. Inverter 34 includes transistors T11 to T16 as six switching elements, and six diodes D11 to D16 connected in parallel to six transistors T11 to T16. Transistors T11 to T16, respectively, are arranged in pairs of two so as to be the source side and sink side with respect to the positive side line and the negative side line of the power line 38. Each of the connecting points of the transistors which are the pair of the transistors T11 to T16 is connected to each of the three-phase (U-phase, V-phase, and W-phase) coils of the motor 32. Therefore, when a voltage is applied to the inverter 34, the ratio of the on-time of T16 from the pair of transistors T11 is adjusted by ECU 50, so that a rotating magnetic field is formed in the three-phase coil, and the motor 32 is rotationally driven.

The first battery 36 is configured as, for example, a lithium ion secondary battery or a nickel hydrogen secondary battery having a rated voltage of about several hundred volts, and has a specification that is removed by a user and cannot be transported indoors. The first battery 36 is connected to the power line 38 via a transistor (first connecting and disconnecting device) 35 as a switching element. Accordingly, the transistor 35 disconnects and connects the first battery 36 and the power line 38. Incidentally, the power line 38, DCDC converter 38a for inputting and outputting the power of the power line 38 to and from the accessories and auxiliary batteries (not shown) is attached. The electric device 37 is configured as, for example, a seat heater built in a seat on which an occupant is seated, and is operated by electric power from the first battery 36.

Figure 2:
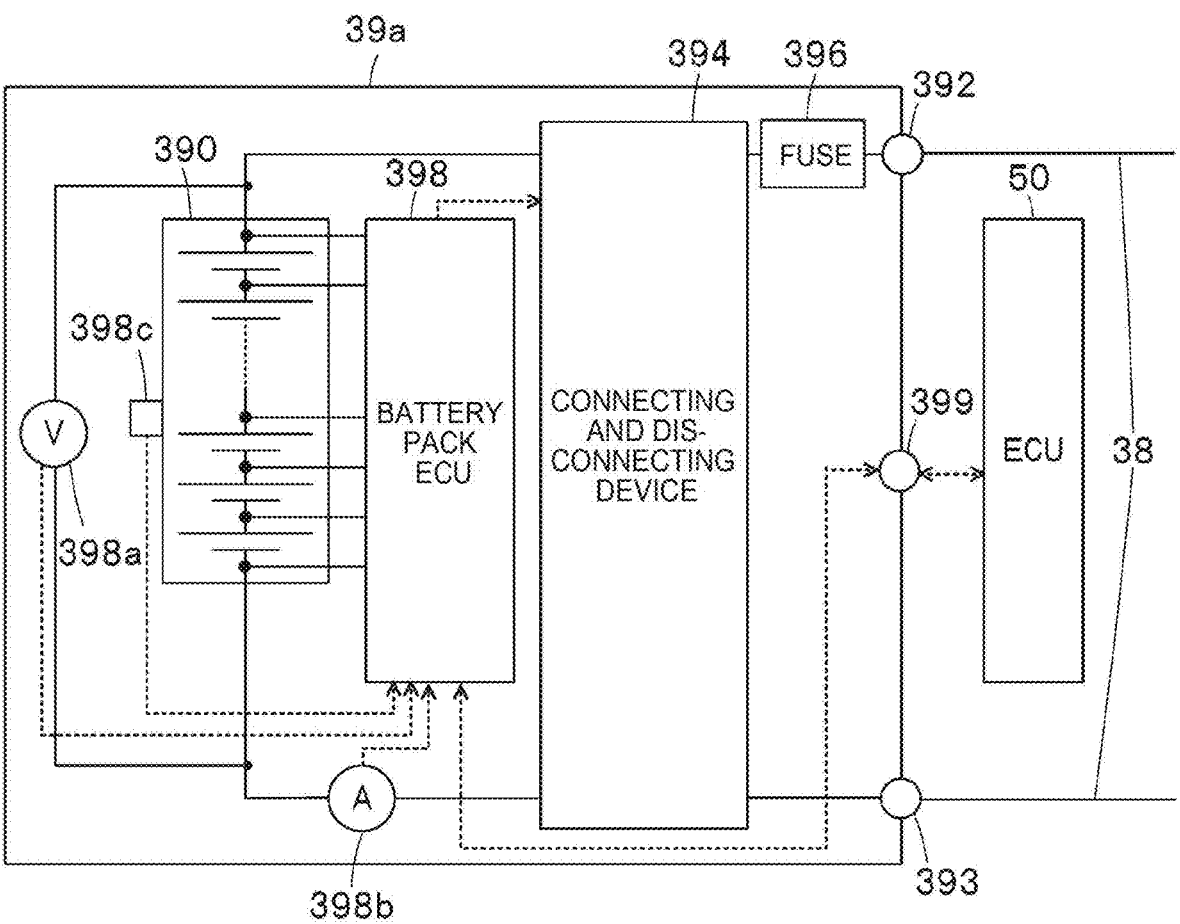

The second battery 39 is configured such that two portable battery-pack 39a that are detachable and can be transported indoors by a user are connected in series, and the rated voltage as a whole is about several hundred volts. FIG. 2 is a configuration diagram illustrating an outline of a configuration of a battery pack 39a according to an embodiment of the present. The battery pack 39a includes a cell stack 390, a connecting and disconnecting device (second connecting and disconnecting device) 394, a fuse 396, and an electronic control unit for a battery pack (hereinafter, referred to as a "battery pack ECU") 398. The cell stack 390 is formed by stacking battery cells of a secondary battery such as a lithium-ion secondary battery or a nickel-hydrogen secondary battery. The connecting and disconnecting device 394 includes two transistors connected between the power terminals 392, 393 connected to the power line 38 and the output terminal of the cell stack 390. By turning on and off the two transistors, the power line 38 and the cell stack 390 are connected and disconnected from each other. The fuse 396 is connected between the power terminal 392 and the connecting and disconnecting device 394. The battery pack ECU 398 includes a microcomputer, and the microcomputer includes a CPU, a ROM, RAM, a flash memory, an input/output port, and a communication port. The battery pack ECU 398 receives signals from various sensors via input ports. For example, the battery pack ECU 398 receives a voltage Vb2 from the voltage sensor 398a, a current Ib2 from the current sensor 398b, a temperature Tb2 from the temperature sensor 398c, and an installation signal from the installation detection sensor. The voltage sensor 398a is mounted between the terminals of the cell stack 390. The current sensor 398b is attached to the output terminal of the cell stack 390. The temperature sensor 398c detects the temperature of the cell stack 390. The installation detection sensor detects whether the battery pack 39a is installed. The battery pack ECU 398 outputs various control signals such as control signals to the transistors of the connecting and disconnecting device 394 via output ports. The battery pack ECU 398 calculates the state of charge SOC2a of the cell stack 390a based on the integrated value of the current Ib2 of the cell stack 390 from the current sensor 398b. Here, the state of charge SOC2a is a ratio of the capacity divided by the cell stack 390a to the total capacity of the cell stack 390a. The battery pack ECU 398 calculates the degradation state SOH2 of the cell stack 390 as the integrated value of the absolute value of the current Ib2 of the cell stack 390 from the current sensor 398b. The battery pack ECU 398 exchanges various types of data with ECU 50 via the terminal 399. Each battery pack 39a thus configured is removed by the user after system shutdown of the battery electric vehicle 20, transported indoors, and charged by being connected to an indoor charger. In addition, the respective battery packs 39a are configured to be transported from indoors to battery electric vehicle 20 when the user uses battery electric vehicle 20 and attached to the power line 38 by the user.

ECU 50 includes a microcomputer, and the microcomputer includes a CPU, a ROM, RAM, a flash memory, an input/output port, and a communication port. ECU 50 receives signals from various sensors via input ports. For example, ECU 50 receives a rotational position Om from a rotational position sensor (for example, a resolver) 32a that detects the rotational position of the rotor of the motor 32, and a phase current Iv, Iw from a current sensor 32v, 32w that detects the V-phase and W-phase currents of the motor 32. ECU 50 also receives a voltage Vb1 from a voltage sensor 36a attached between terminals of the first battery 36, a current Ib1 from a current sensor 36b attached to an output terminal of the first battery 36, and a temperature Tb1 from a temperature sensor 36v for detecting a temperature of the first battery 36. ECU 50 also receives a start signal from the start switch 60, a shift position SP from the shift sensor 62, an accelerator operation amount Acc from the accelerator pedal position sensor 64, a brake pedal position BP from the brake pedal position sensor 66, a vehicle speed V from the vehicle speed sensor 67, an outside air temperature Tatm from the temperature sensor 68, and an incoming signal from the display 70. The shift sensor 62 detects an operation position of the shift lever 61. The accelerator pedal position sensor 64 detects the amount of depression of the accelerator pedal 63. The brake pedal position sensor 66 detects the amount of depression of the brake pedal 65. The temperature sensor 68 detects the outside air temperature. The display 70 is configured as a touch panel and is installed in an occupant room. ECU 50 outputs various control signals such as a control signal from the transistors T11 to T16 of the inverter 34, a control signal to a speaker (notification device) 69 installed in the passenger compartment, and a control signal to the display 70 via an output port. ECU 50 calculates the electric angle de and the rotational speed Nm of the motor 32 based on the rotational position Om of the rotor of the motor 32 from the rotational position sensor 32a. ECU 50 calculates the state of charge SOC1 of the first battery 36 based on the integrated value of the current Ib1 from the current sensor 36b. Here, the state of charge SOC1 is a ratio of the capacity divided by the first battery 36 to the total capacity of the first battery 36. ECU 50 calculates the degradation state SOH1 of the first battery 36 as the integrated value of the absolute value of the current Ib1 of the first battery 36 from the current sensor 36*b*. As described above, ECU 50 exchanges various types of data with the battery pack ECU 398 via communication.

In battery electric vehicle 20 of the embodiment configured as described above, ECU 50 sets the required torque Td* required for the drive shaft 26 based on the accelerator operation amount Acc and the vehicle speed V, sets the set required torque Td* to the torque command Tm* of the motor 32, and performs switching control of T16 from the transistor T11 of the inverter 34 so that the motor 32 is driven by the torque command Tm*. At system shutdown of the battery electric vehicle 20, the transistor 35 and the connecting and disconnecting device 394 of the battery packs 39*a* of the second battery 39 are turned off.

Figure 3:
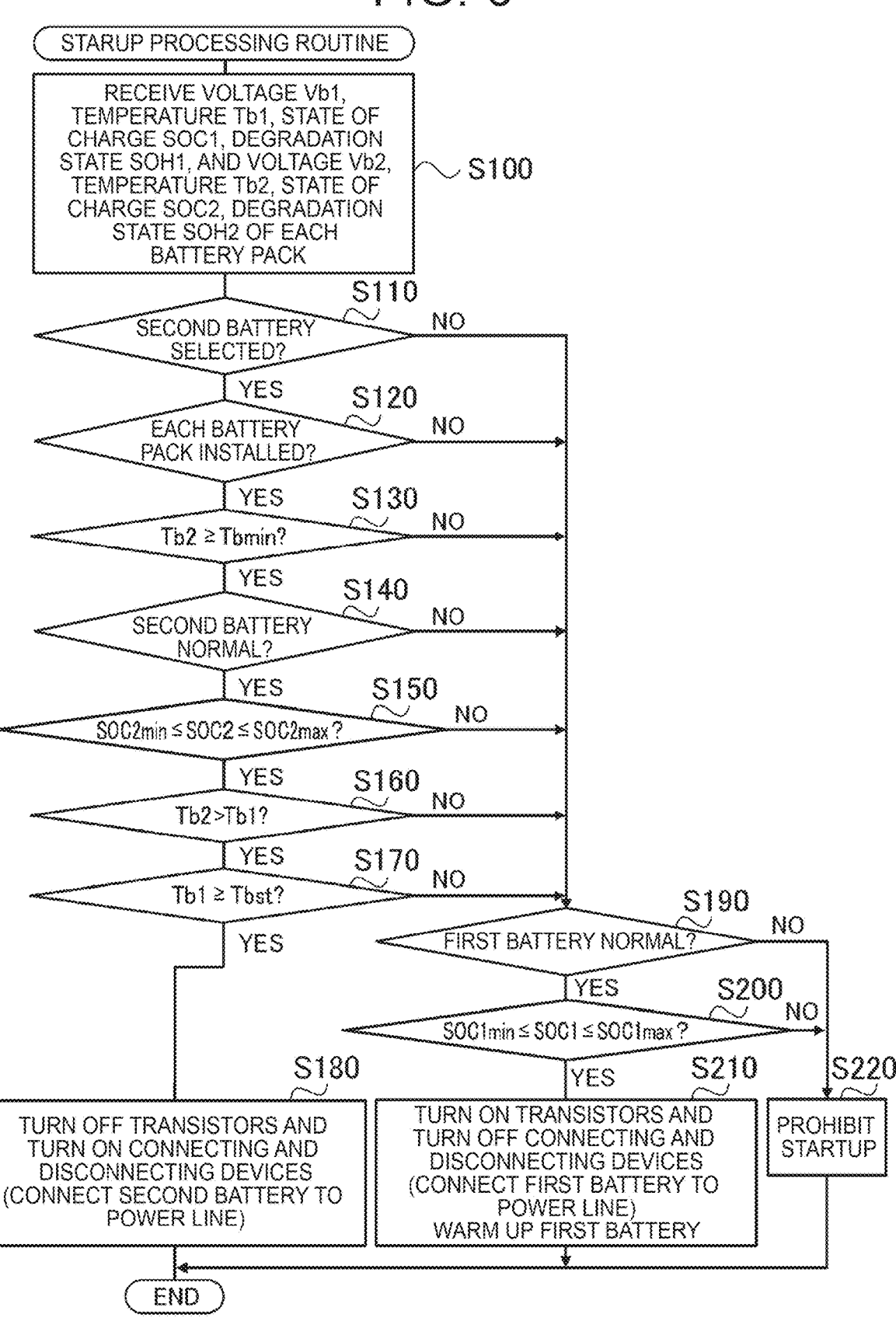
FIG. 3 is a flowchart illustrating an example of a start-up processing routine.

Next, the operation of battery electric vehicle 20 of the embodiment configured in this way, in particular, the operation at system startup and the operation at system shutdown will be described. FIG. 3 is a flowchart illustrating an example of a startup processing routine executed by ECU 50. The start-up processing routine is executed when the start switch 60 is turned on and a system startup instruction is given.

When the startup processing routine is executed, ECU 50's CPU executes a process of inputting the voltage Vb1, the temperature Tb1, the state of charge SOC1, the degradation state SOH1, the voltage Vb2 of the respective battery packs 39*a*, the temperature Tb2, the state of charge SOC2, and the degradation state SOH2 (S100). The voltage Vb1 and the temperature Tb1 are respectively inputted with the values detected by the voltage sensor 36*a* and the temperature sensor 36*c*. The state of charge SOC1 and the degradation state SOH1 are calculated by ECU 50. The voltage Vb2 and temperature Tb2 of each battery pack 39*a* are detected by the voltage sensor 398*a* and temperature sensor 398*c* of each battery pack 39*a*, and the detected values are input through communication via the battery pack ECU 398 of each battery pack 39*a*. The state of charge SOC2 and degradation state SOH2 of each battery pack 39*a* are calculated by the battery pack ECU 398 of each battery pack 39*a* and the calculated values are input respectively by communication.

Subsequently, the CPU of ECU 50 determines whether the second battery 39 is selected as a battery to be used by the user by inputting the display 70 (S110). When the traveling distance is increased, the user may intend to actively use the second battery 39. Further, since the second battery 39 is detachable, it may be desired to be used as a power source for another electric device at a destination, instead of being used as a power source for traction, for example, for use in a camp site. In such a case, the first battery 36 or the second battery 39 may be selected as the battery to be used by the user by the input of the display 70.

When the second battery 39 is selected in S110, CPU of ECU 50 determines whether the battery packs 39*a* of the second battery 39 are installed (S120). When each battery pack 39*a* is installed, the CPU of the ECU 50 determines whether the temperature Tb2 of each battery pack 39*a* is equal to or higher than the lower limit temperature Tbmin (S130). The lower limit temperature Tbmin is a lower limit of an allowable temperature range allowed for use of the second battery 39 (each battery pack 39*a*).

In S130, when the temperature Tb2 of all the battery pack 39*a* is equal to or higher than the lower limit temperature Tbmin, CPU of ECU 50 determines that the second battery 39 (each battery pack 39*a*) is a temperature suitable for use, and determines whether the second battery 39 is normal (first condition) (S140). This determination determines that the second battery 39 is normal when two conditions are satisfied: a condition in which the voltage Vb2 of the respective battery packs 39*a* is within a normal voltage range, and a condition in which the degradation state SOH2 is less than a value indicating that the battery pack 39*a* is greatly deteriorated. When the second battery 39 is normal in S140, CPU of ECU 50 determines whether or not the state of charge SOC2 of the respective battery packs 39*a* is within the allowable range of the lower limit state of charge SOC2min or more and the upper limit state of charge SOC2 max or less (second condition) (S150). The lower limit state of charge SOC2 min and the upper limit state of charge SOC2max are values determined in advance as the lower and upper limit values of the state of charge that are allowed when the battery pack 39*a* is used. When the state of charge SOC2 is within the allowable range in S150, CPU of ECU 50 determines whether or not the temperature Tb2 of the respective battery packs 39*a* is higher than the temperature Tb1 of the first battery 36 (third condition) (S160). In S160, when the temperature Tb2 of the respective battery packs 39*a* is higher than the temperature Tb1 of the first battery 36, CPU of ECU 50 determines whether or not the temperature Tb1 start temperature Tbst of the first battery 36 (e.g., −12° C., −10° C., −8° C., etc.) or more is within the no-warmup range (fourth condition) (S170). The starting temperature Tbst is a temperature at which the temperature Tb1 of the first battery 36 is a lower limit of a temperature that can be used without warming up the first battery 36. When the temperature Tb1 of the first battery 36 is less than the start temperature Tbst, the second battery 39 is used at the time of system startup, and when the state of charge SOC of the second battery 39 becomes low, there is a possibility that the first battery 36 cannot be used without warm-up even if the first battery 36 is used. S170 is a determination made in view of the above, and is a process of determining whether the first battery 36 can be used without warmup after using the second battery 39. In S170, when the temperature Tb1 of the first battery 36 is equal to or higher than the start temperature Tbst, CPU of ECU 50 turns off the transistor 35 to disconnect the power line 38 from the first battery 36. Then, CPU of ECU 50 connects the power line 38 and the second battery 39 by turning on the connecting and disconnecting devices 394 of the battery packs 39*a* (S180), and ends the startup processing routine. From this process, the power line 38 and the second battery 39 are connected to each other at the time of system startup, and the second battery 39 is used after system startup. As described above, when the temperature Tb2 of all the battery packs 39*a* is equal to or higher than the lower limit temperature Tbmin and the condition of S170 is satisfied from S140, the second battery 39 is preferentially used over the first battery 36, and the use of the first battery 36 is reduced. Therefore, warmup of the first battery 36 is reduced. Accordingly, power consumption for warming up the battery can be reduced.

When the second battery 39 is not selected in S110 or when the battery packs 39*a* are not installed in S120, the conditions of S140 to S170 may not be satisfied even when the temperature Tb2 of any of the battery packs 39*a* is lower than the lower limit temperature Tbmin in S130 and the temperature Tb2 of all the battery packs 39*a* is equal to or higher than the lower limit temperature in S130. In this instance, CPU of ECU 50 determines that the first battery 36 is better used than the second battery 39, and determines whether the first battery 36 is normal (S190). This determination is made that the first battery 36 is normal when two conditions are satisfied: a condition in which the voltage Vb1 of the first battery 36 is within a normal voltage range, and a condition in which the degradation state SOH1 is less than a value indicating that the first battery 36 is greatly deteriorated. When the first battery 36 is normal in S190, it is determined whether or not the state of charge SOC1 of the first battery 36 is within the allowable range of the lower limit state of charge SOC1min or more and the upper limit state of charge SOC1max or less (S200). The lower limit state of charge SOC1min and the upper limit state of charge SOC1max are values determined in advance as the lower and upper limit values of the state of charge that are allowed when the first battery 36 is used. In S200, when the state of charge SOC1 is within the allowable range, CPU of ECU 50 connects the power line 38 and the first battery 36 by turning on the transistor 35. Further, CPU of ECU 50 turns off the connecting and disconnecting devices 394 of the battery packs 39*a* to disconnect the power line 38 from the second battery 39, and activates the electric device 37 to warm up the first battery 36 by S210 of the inner resistance of the first battery 36. In this way, CPU of ECU 50 ends the startup processing routine. From this process, the power line 38 and the first battery 36 are connected to each other during system startup, and the first battery 36 is used after system startup. As described above, the first battery 36 can be used when the temperature Tb2 of any one of the battery packs 39*a* is less than the lower limit temperature Tbmin and S210 is satisfied from S190. At this time, since the first battery 36 is warmed up, the first battery 36 can be put into a good use state.

When the first battery 36 is not normal in S190 or when the state of charge SOC1 is not within the allowable range in S200, it is determined that the first battery 36 should not be used, and system startup is prohibited (S220), and the startup processing routine is ended. When the first battery 36 is not normal or when the state of charge SOC1 is out of the allowable range, there is a possibility that battery electric vehicle 20 cannot travel after battery electric vehicle 20 starts traveling using the first battery 36 and before reaching the destination. When the first battery 36 is not normal or when the state of charge SOC1 is out of the allowable range, system startup is prohibited, thereby preventing battery electric vehicle 20 from being able to travel after starting the travel and before reaching the destination.

Figure 4:
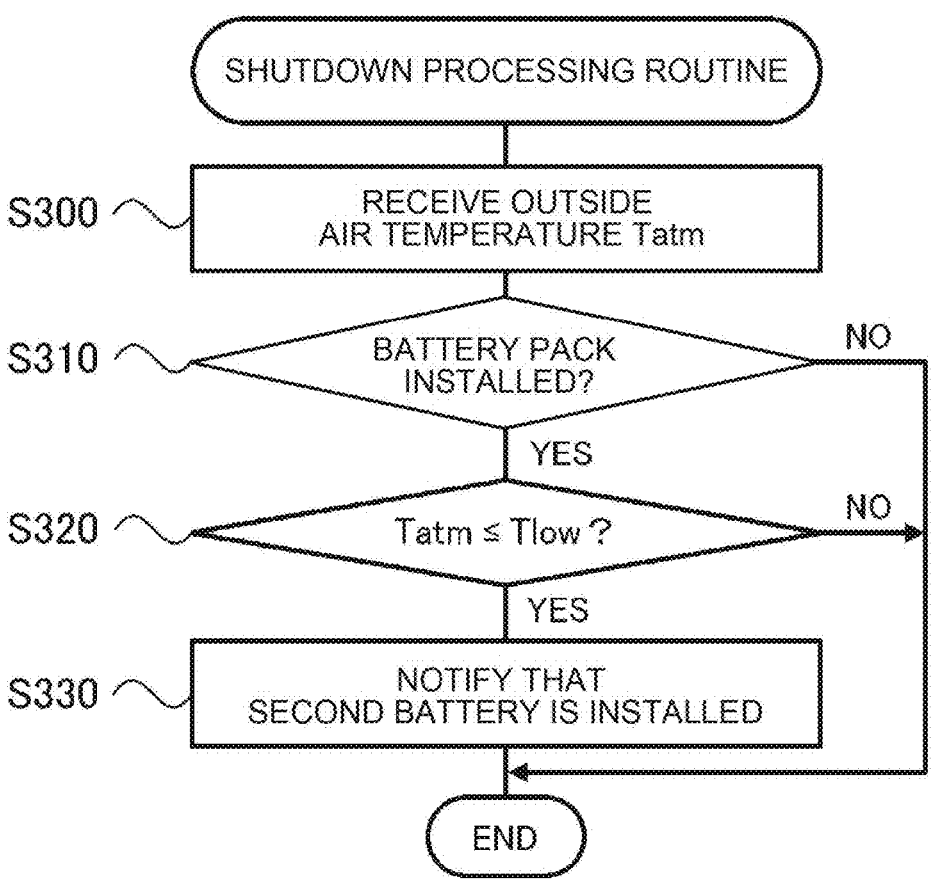
FIG. 4 is a flowchart illustrating an example of a shutdown processing routine.

Next, the operation at system shutdown of the battery electric vehicle 20 will be described. FIG. 4 is a flowchart showing an example of a shutdown processing routine executed by ECU 50. The shutdown processing routine is executed when the system shutdown instruction is given by pressing the start switch 60 during system startup.

When the shutdown processing routine is executed, CPU of ECU 50 executes processing of inputting the outside air temperature Tatm detected by the temperature sensor 68 (S300). Subsequently, it is determined whether the second battery 39, that is, the battery packs 39*a*, are installed (S310), and whether the outside air temperature Tatm is equal to or lower than the predetermined temperature Tlow (S320). The predetermined temperature Tlow is a threshold value of the outside air temperature at which the second battery 39 deteriorates when the second battery 39 is left attached to the power line 38, and is set to, e.g., −20° C., −15° C., −10° C., etc. When the battery packs 39*a* are not installed or when the outside air temperature Tatm exceeds the predetermined temperature Tlow even when the battery packs 39*a* are installed, the shutdown processing routine is terminated.

When the battery packs 39*a* are installed in S310 and the outside air temperature Tatm is equal to or lower than the predetermined temperature Tlow in S320, the CPU of the ECU 50 determines that the second battery 39 should not be left. Then, CPU of the ECU 50 outputs the fact that the second battery 39 is attached by sound from the speaker 69 (S330), and ends the shutdown processing routine. By this process, it is possible to notify the user and to make the user aware that the second battery 39 is attached, and to prompt the user to remove the battery packs 39*a* of the second battery 39. This reduces the possibility of forgetting to remove the battery packs 39*a*, and the second battery 39 can be stored more reliably in high temperature location such as indoor. Accordingly, the temperature of the second battery 39 can be set within the allowable temperature range at system startup. Further, the second battery 39 can be more properly preferentially connected to the power line 38 over the first battery 36, the second battery 39 can be preferentially used over the first battery 36, and the power consumption for warming up the first battery 36 can be reduced. In S330, it may be determined that the second battery 39 should not be left unattended, and a message indicating that the second battery 39 is attached may be displayed on the display 70.

According to battery electric vehicle 20 of the embodiment described above, the transistor 35 and the connecting and disconnecting devices 394 are controlled so that the second battery 39 is preferentially connected to the power line 38 over the first battery 36 when the temperature Tb2 of the second battery 39 is within the allowable temperature range equal to or higher than the lower limit temperature Tbmin when the system startup instruction is given. Therefore, power consumption for warming up the first battery 36 can be reduced.

When the system startup instruction is given and the temperature Tb2 of the battery packs 39*a* is within the allowable temperature range, a predetermined connection condition including S170 may be satisfied from S140. In this case, the transistor 35 and the connecting and disconnecting devices 394 are controlled so that the connection between the power line 38 and the first battery 36 is disconnected and the power line 38 and the second battery 39 are connected. When the predetermined connection condition is not satisfied, the transistor 35 and the connecting and disconnecting device 394 are controlled so that the power line 38 and the first battery 36 are connected and the power line 38 and the second battery 39 are disconnected from each other, and the electric device 37 is operated to warm up the first battery 36. Therefore, the second battery 39 can be more properly preferentially connected to the power line 38 over the first battery 36, and the second battery 39 can be preferentially used over the first battery 36.

Further, since the predetermined connection condition is satisfied when all of S170 are satisfied from S140, there is a possibility that the second battery 39 is more properly preferentially connected to the power line 38 over the first battery 36, and the second battery 39 is preferentially used over the first battery 36.

Further, a system startup instruction may be given, and the temperature Tb2 of the second battery 39 may be lower than the lower limit temperature Tbmin and outside the allowable temperature range. Alternatively, when the system startup instruction is given and the temperature of the second battery 39 is within the allowable temperature range equal to or higher than the lower limit temperature Tbmin and the predetermined connection condition including S170 is not satisfied from S140, the first battery 36 may be normal and the state of charge SOC of the first battery 36 may be within the allowable state of charge range of the first battery 36. In these cases, the transistor 35 and the connecting and disconnecting devices 394 are controlled so that the power line 38 and the first battery 36 are connected and the connection between the power line 38 and the second battery 39 is disconnected. In addition, when the first battery 36 is warmed up by operating the electric device 37, and the first battery 36 is not normal, or when the state of charge SOC1 of the first battery 36 is outside the allowable state of charge range of the first battery 36, system startup is prohibited. Accordingly, it is possible to prevent battery electric vehicle 20 from being unable to travel after starting the travel and prior to reaching the destination.

A speaker 69 as a notification device for notifying information is provided. When the second battery 39 is installed at system shutdown, the speaker 69 is controlled to notify information indicating that the second battery 39 is installed. Therefore, more appropriately, the second battery 39 is preferentially connected to the power line 38 over the first battery 36, the second battery 39 is preferentially used over the first battery 36, and the power consumption for warming up the first battery 36 can be reduced.

Figure 5:
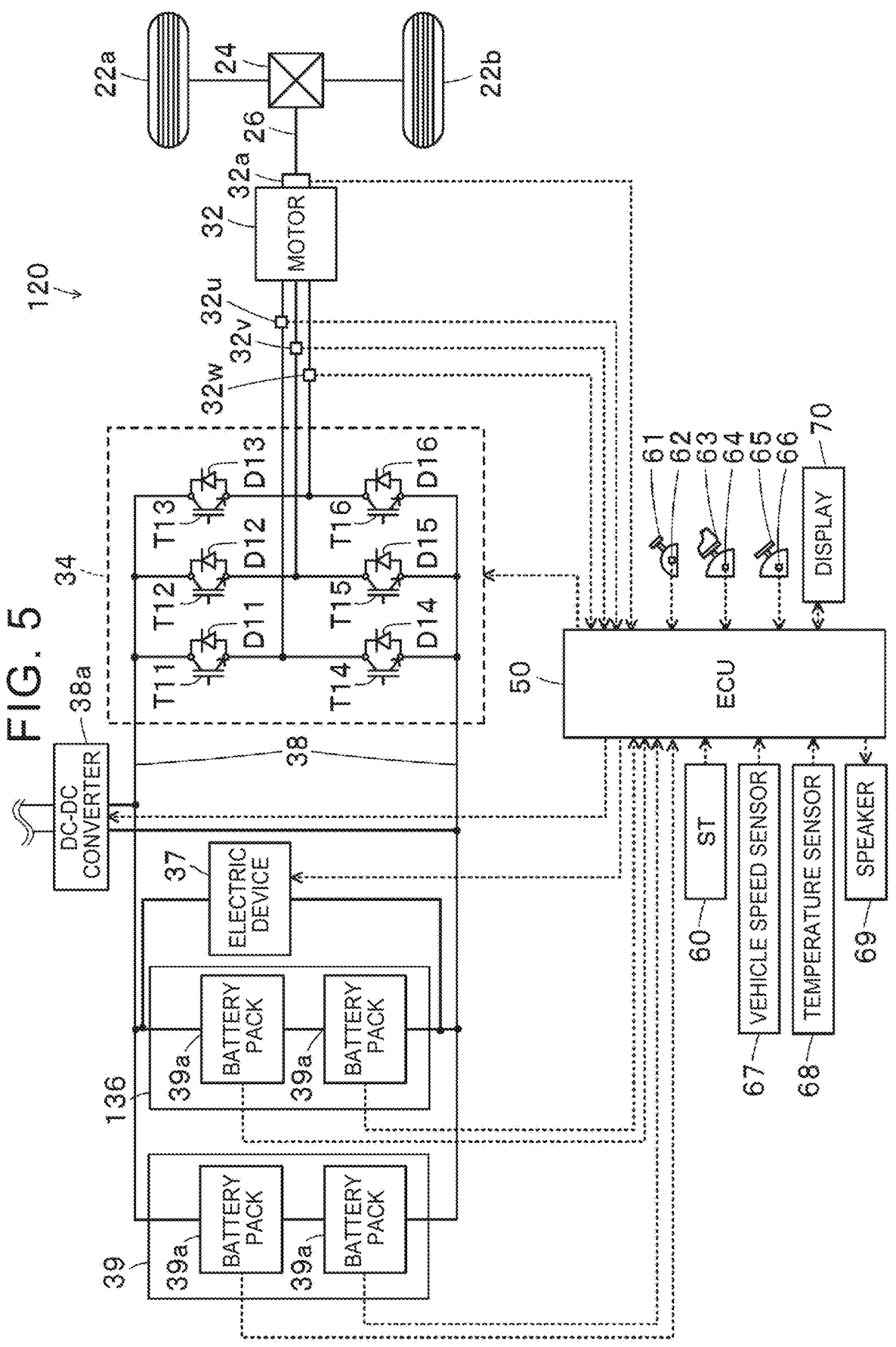
FIG. 5 is a schematic configuration diagram of a battery electric vehicle 120 according to another embodiment.

In the above-described embodiment, the first battery 36 is removed by the user and cannot be transported indoors. However, as exemplified by the first battery 136 in battery electric vehicle 120 of the other embodiment of FIG. 5, in place of the first battery 36, a first battery 136 configured such that two portable battery packs 39a, which are detachable and can be transported indoors by a user, are connected in series and the rated voltage is about several hundred volts as a whole may be used in the same manner as the second battery 39. In this case, the first battery 136 is not warmed up by the electric device 37. In battery electric vehicle 120 of another embodiment, when a system startup instruction is given, the startup processing routine illustrated in of FIG. 6 is executed instead of the startup processing routine illustrated in of FIG. 3.

Figure 6:
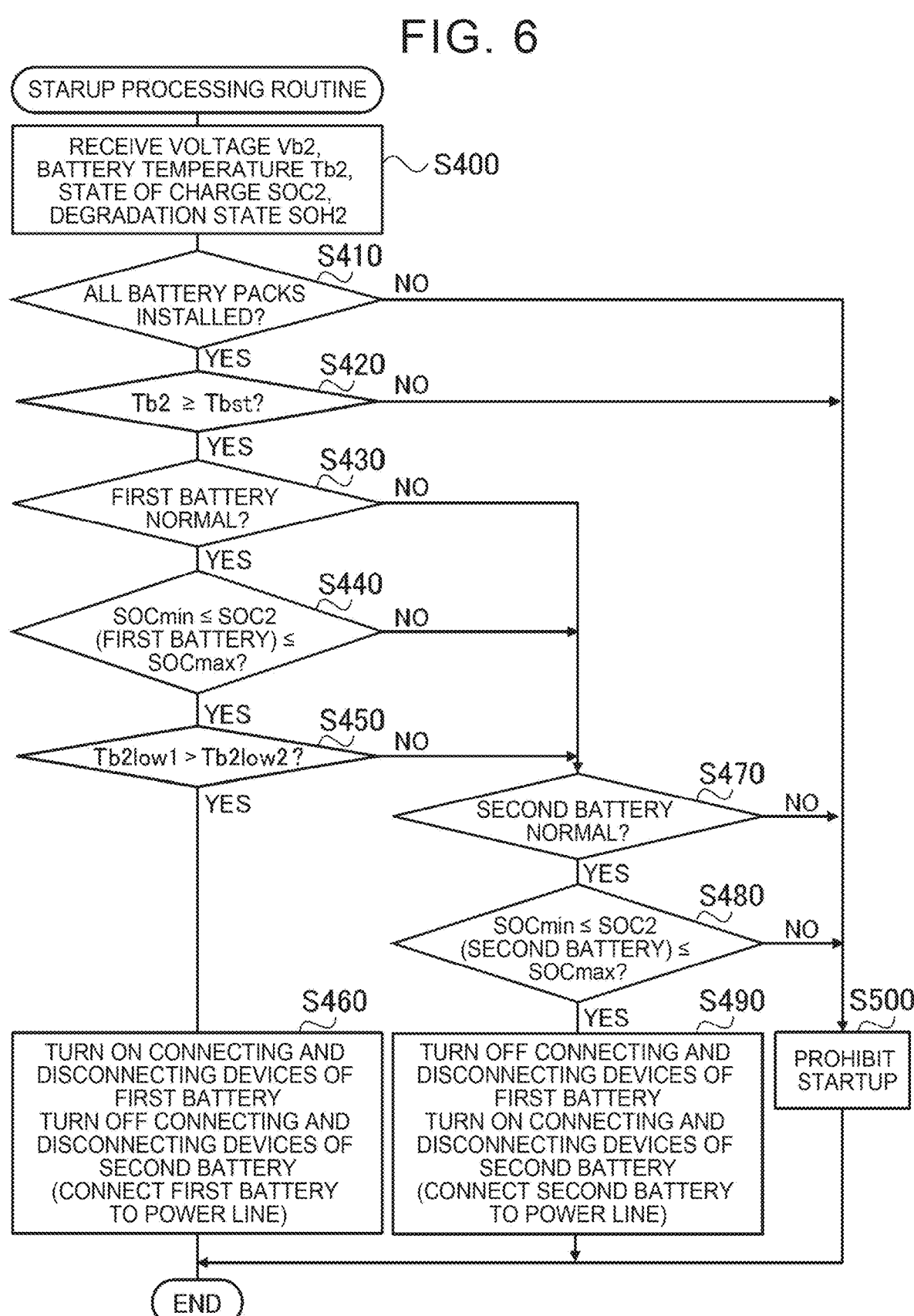
FIG. 6 is a flowchart illustrating an example of a start-up processing routine according to another embodiment.

When startup processing routine of FIG. 6 is executed, ECU 50's CPU executes processing of inputting the voltage Vb2, the temperature Tb2, the state of charge SOC2, and the degradation state SOH2 of the battery packs 39a of the first battery 136 and the second battery 39 (S400). The voltage Vb2 and temperature Tb2 of each battery pack 39a are detected by the voltage sensor 398a and temperature sensor 398c of each battery pack 39a, and the detected values are input through communication via the battery pack ECU 398 of each battery pack 39a. The state of charge SOC2 and degradation state SOH2 of each battery pack 39a are calculated by the battery pack ECU 398 of each battery pack 39a and the calculated values are input respectively by communication.

Next, CPU of ECU 50 determines whether all the battery packs 39a of the first battery 136 and the second battery 39 are installed (S410). When all the battery pack 39a are installed, the CPU of the ECU 50 determines whether the temperature Tb2 of all the battery packs 39a is equal to or higher than the start temperature Tbst (S420). When the temperature Tb2 of all the battery packs 39a is equal to or higher than the start temperature Tbst in S420, CPU of ECU 50 determines whether the first battery 136 is normal (S430). This determination is made that the first battery 136 is normal when two conditions are satisfied: a condition in which the voltage Vb2 of the respective battery packs 39a of the first battery 136 is within a normal voltage range, and a condition in which the degradation state SOH2 is less than a value indicating that the battery pack 39a is greatly deteriorated. When the first battery 136 is normal in S430, CPU of ECU 50 determines whether the state of charge SOC2 of each battery pack 39a of the first battery 136 is within the allowable range of the lower limit state of charge SOC2min or more and the upper limit state of charge SOC2max or less (S440). In S440, when the state of charge SOC2 is within the allowable range, the CPU of the ECU 50 determines whether the lowest temperature Tb2low1 out of the temperatures Tb2 of the battery packs 39a of the first battery 136 is higher than the lowest temperature Tb2low2 out of the temperatures Tb2 of the battery packs 39a of the second battery 39 (S450). When the temperature Tb2low1 is higher than the temperature Tb2low2, the CPU of the ECU 50 determines that the first battery 136 should be preferentially used over the second battery 39. Then, CPU of ECU 50 connects the power line 38 and the first battery 36 by turning on the connecting and disconnecting devices 394 of the battery packs 39a of the first battery 136. Further, the CPU of the ECU 50 turns off the connecting and disconnecting device 394 of the battery packs 39a of the second battery 39 to disconnect the power line 38 from the second battery 39 (S460), and ends the startup process routine.

When S450 is not satisfied from S430, it is determined whether or not the second battery 39 is normal in the same process as S140 of the startup processing routine illustrated in of FIG. 3 (S470). When the second battery 39 is normal, CPU of ECU 50 determines whether the state of charge SOC2 of each battery pack 39a of the second battery 39 is within the allowable range of the lower limit state of charge SOC2min or more and the upper limit state of charge SOC2max or less (S480). This processing is the same processing as S150 of the start-up processing routine exemplified in FIG. 3. When the state of charge SOC2 is within the allowable range in S480, it is determined that the second battery 39 should be used preferentially over the first battery 136 in the same processing as S150 of the startup processing routine illustrated in of FIG. 3. Then, CPU of ECU 50 turns off the connecting and disconnecting devices 394 of the battery packs 39a of the first battery 136 to disconnect the power line 38 from the first battery 36. Further, the CPU of ECU 50 turns off the connecting and disconnecting device 394 of the battery packs 39a of the second battery 39 to connect the power line 38 to the second battery 39 (S490), and ends the startup process routine.

When not all of the battery packs 39a are installed in S410, the temperature Tb2 of any of the battery packs 39a is less than the starting temperature Tbst in S420, the second battery 39 is not normal in S470, or the state of charge SOC2 is out of the allowable range in S480, the CPU of the ECU 50 determines that the first battery 136 and the second battery 39 should not be used, prohibits system startup (S500), and ends the startup processing routine. With such a process, it is possible to prevent battery electric vehicle 20 from being unable to travel after starting the travel and prior to reaching the destination.

In the above embodiment, S170 is executed from S140, but it is not necessary to select and execute a part of the processes among the four processes, and to execute a process that is not selected. In the above embodiment, the shutdown processing routine shown in FIG. 4 is executed at system shutdown. However, the shutdown processing routine may not be executed. In the above embodiment, the inconvenience at the low temperature of the first battery 36 and the second battery 39 of the present disclosure is dealt with, but the inconvenience at the high temperature may be dealt with. In this case, for example, S130 may be appropriately changed to whether the temperature Tb2 of each battery pack 39a is equal to or lower than the upper limit temperature Tmax that is the allowable temperature range. In the above embodiment, the second battery 39 is configured such that two battery packs 39a are connected in series. However, the second battery 39 may be configured such that three or more battery pack 39a are connected in series, or the second battery 39 may be configured such that one battery pack 39a is provided. The second battery 39 may be configured such that a plurality of battery packs 39a are connected in parallel.

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

What is claimed is:

1. A battery electric vehicle comprising:
a traction motor;
an inverter that drives the motor;
a first battery;
an electric device that runs on electric power from the first battery;
a detachable portable second battery;
a first connecting and disconnecting device connecting and disconnecting a power line connected to the inverter and the first battery to and from each other;
a second connecting and disconnecting device connecting and disconnecting the power line and the second battery to and from each other; and
a control device that controls the first connecting and disconnecting device and the second connecting and disconnecting device, wherein in a case where a system startup instruction is given, the control device controls the first and second connecting and disconnecting devices in such a manner that the second battery is preferentially connected to the power line over the first battery when a temperature of the second battery is within an allowable temperature range of the second battery, and wherein in a case where the system startup instruction is given and the temperature of the second battery is within the allowable temperature range of the second battery, the control device controls the first and second connecting and disconnecting devices in such a manner that the power line and the first battery are disconnected and the power line and the second battery are connected when a predetermined connection condition is satisfied, and the control device controls the first and second connecting and disconnecting devices in such a manner that the power line and the first battery are connected and the power line and the second battery are disconnected and operates the electric device to warm up the first battery when the predetermined connection condition is not satisfied.

2. The battery electric vehicle according to claim 1, wherein the predetermined connection condition is that all of conditions selected from the following four conditions are satisfied: a first condition that the second battery is normal, a second condition that a state of charge of the second battery is within an allowable state of charge range of the second battery, a third condition that the temperature of the second battery is higher than a temperature of the first battery, and a fourth condition that the temperature of the first battery is within a no-warmup range in which the first battery is usable without being warmed up.

3. The battery electric vehicle according to claim 1, wherein in a case where the system startup instruction is given and the temperature of the second battery is out of the allowable temperature range, or in a case where the system startup instruction is given, the temperature of the second battery is within the allowable temperature range, and the predetermined connection condition is not satisfied, the control device controls the first and second connecting and disconnecting devices in such a manner that the power line and the first battery are connected and the power line and the second battery are disconnected and operates the electric device to warm up the first battery when the first battery is normal and a state of charge of the first battery is within an allowable state of charge range of the first battery, and the control device prohibits system startup when the first battery is not normal or the state of charge of the first battery is out of the allowable state of charge range of the first battery.

4. The battery electric vehicle according to claim 1, further comprising a notification device that notifies information, wherein when the second battery is installed at system shutdown, the control device controls the notification device to notify information indicating that the second battery is installed.

* * * * *